US005551053A

United States Patent [19]
Nadolski et al.

[11] Patent Number: 5,551,053
[45] Date of Patent: Aug. 27, 1996

[54] SYSTEM AND METHOD FOR ASSIGNING ADDRESSES TO I/O DEVICES IN A CONTROL NETWORK AND FOR VERIFYING THE ASSIGNED ADDRESS OF THE DEVICES

[75] Inventors: Gregory L. Nadolski, Brookfield; Keith O. Satula, New Berlin, both of Wis.

[73] Assignee: Eaton Corporation, Cleveland, Ohio

[21] Appl. No.: 202,501

[22] Filed: Feb. 28, 1994

[51] Int. Cl.⁶ ................................................ G06F 13/00
[52] U.S. Cl. .................. 395/829; 395/200.2; 395/828; 395/497.01
[58] Field of Search .................................. 395/200, 497, 395/828, 829

[56] References Cited

U.S. PATENT DOCUMENTS

| | | | |
|---|---|---|---|
| 4,354,258 | 10/1982 | Sato | 365/230 |
| 4,360,870 | 11/1982 | McVey | 364/200 |
| 4,373,181 | 2/1983 | Chisholm et al. | 395/275 |
| 4,660,141 | 4/1987 | Ceccon et al. | 395/550 |
| 4,701,878 | 10/1987 | Giinkel et al. | 364/900 |
| 4,725,835 | 2/1988 | Schreiner et al. | 340/825.83 |
| 4,755,934 | 7/1988 | Inoue | 364/200 |
| 4,769,782 | 9/1988 | Iwanga | 364/900 |
| 4,803,623 | 2/1989 | Klashka et al. | 364/200 |
| 4,964,038 | 10/1990 | Louis et al. | 364/200 |
| 5,175,822 | 12/1992 | Dixon et al. | 395/275 |
| 5,265,241 | 11/1993 | Arnold et al. | 395/575 |
| 5,274,771 | 12/1993 | Hamilton et al. | 395/275 |
| 5,276,400 | 6/1994 | Jolissaint et al. | 340/825.02 |
| 5,394,503 | 2/1995 | Dietz, Jr. et al. | 385/135 |
| 5,422,631 | 6/1995 | Gertz | 340/825.25 |
| 5,428,748 | 6/1995 | Davidson et al. | 395/275 |
| 5,444,642 | 8/1995 | Montgomery et al. | 364/500 |
| 5,457,791 | 10/1995 | Matsumoto et al. | 395/182.03 |

OTHER PUBLICATIONS

Article entitled "Intel Chips Meet CAN Auto Specs", *Electronic Buyer's News*, Aug. 17, 1992.
Article entitled "Chips Push CAN Bus into Embedded World", *Electronic Engineering Times*, Aug. 24, 1992.
Motorola Semiconductor Technical Data brochure, © 1991, entitled "Product Review MC68HC705X4 8–bit Microprocessor with on–board CAN Module".
Article entitled "Controller Chip Boosts CAN Protocol Usage", *Electrical Wholesaling*, Jul. 1992.

*Primary Examiner*—Christopher B. Shin
*Attorney, Agent, or Firm*—Calfee Halter & Griswold

[57] ABSTRACT

A method and system is provided for assigning addresses to input/output (I/O) devices in a control network, and for verifying addresses assigned to the I/O devices. The system comprises a logic controller providing memory into which a connectivity map may be programmed. The connectivity map defines a specific expected address for each I/O device in the system. The logic controller further provides an external controller bus and logic for downloading the connectivity map to an I/O bus manager connected to the logic controller via the external controller bus. The I/O bus manager provides logic for assigning the specific addresses to the I/O devices. Network nodes connect the I/O bus manager to I/O cluster units in the system, each network node including a multiplexer for multiplexing output signals from the I/O bus manager and a demultiplexer for demultiplexing input signals from the I/O cluster units, the multiplexing/demultiplexing functions provided by a controller area network (CAN) integrated circuit. Each I/O cluster unit includes a multiplexer for multiplexing input signals from the I/O devices and a demultiplexer for demultiplexing output signals from its associated network node, the multiplexing/ demultiplexing functions again provided by a controller area network (CAN) integrated circuit. Each I/O cluster unit provides means for manually requesting address assignments and a visual indication of addresses so assigned. Each I/O cluster unit also provides means to manually reject the address assigned to it by the I/O bus manager if the assigned address is not the expected address for the I/O cluster processor defined in the connectivity map.

23 Claims, 8 Drawing Sheets

SYSTEM AND METHOD FOR ASSIGNING ADDRESSES TO I/O DEVICES IN A CONTROL NETWORK AND FOR VERIFYING THE ASSIGNED ADDRESS OF THE DEVICES

FIELD OF THE INVENTION

The present invention relates generally to industrial control networks and more particularly to an addressing scheme for effectively addressing input/output devices in such a control network.

BACKGROUND OF THE INVENTION

A programmable logic controller (PLC) is typically used in industrial applications as the preferred device for controlling various input/output (I/O) devices connected to it. Ordinarily, the PLC is programmed with a logic language which provides an addressing scheme for each of the inputs and outputs in the control system. All of the inputs and outputs within the system must be addressed so that the PLC may correctly identify them in order to be able to control them. Once the devices have been identified to the PLC via these assigned addresses, the PLC may execute a program, such as an internal ladder logic program, to determine outputs generated by the PLC which are based on the status of inputs to the system. The ladder logic typically may be edited and/or viewed by an operator on a display screen attached to the PLC.

One manner of providing addresses to each of the inputs and outputs in the system is to arrange the I/O devices in remote racks, or clusters, and have the PLC address the devices by cluster and by position within the cluster. In such an arrangement, the clusters are strung out serially and the PLC coordinates communications with each of the clusters. Typically, the clusters are provided with DIP (dual in-line pole) switches, the positions of which are set to identify the cluster and the particular I/O devices attached to that cluster for the PLC. During start-up operations, a technician will set the DIP switches on a particular cluster according to a map containing addresses which have been allocated to all of the clusters in the system. This DIP switch means of assigning addresses is hardwired in the sense that the addressing scheme identifying each of the clusters to the PLC is held in the PLC memory.

The DIP switch method of assigning addresses to remote I/O clusters, however, presents problems in that the technician has no positive feedback to confirm that the setting he has made on a particular DIP switch is the correct setting. The only indicator provided is the position of the switches, and even that indication is typically given in binary form which must then be converted into a normal address number to be meaningful to the technician. If the technician assigns an incorrect address to the remote I/O cluster, or if the technician assigns the same address number to more than one I/O cluster, the system will not operate as designed.

In addition to being initially set in the wrong position, the DIP switches may be jostled during the course of operation which could adversely affect the initial settings. Further, the mechanical contacts associated with the DIP switches are subject to corrosion over time and thus the switch setting may be altered as the corrosion worsens over time. As a result of any of these conditions, the address identifier which is communicated from the I/O cluster to the PLC may be incorrect, thereby possibly disrupting communications and causing a failure condition within the system.

Another problem with such a PLC-based system is that PLCs do not provide an open communications bus such as that which a personal computer (PC) provides. In addition, software written for PCs is much more available than that written for PLCs. Thus, PLC based control systems are not as easily modified or expanded as PC-based systems. In addition, PCs are generally less expensive and offer more capabilities than PLCs.

Accordingly, there is a need for control system which is universally compatible with existing IEEE standard bus structures and protocols, which eliminates the problems of DIP switches, and which provides a flexible and easily verifiable addressing scheme. The need especially exists for communications networks which broadcast messages simultaneously to multiple or all devices on the network. It is therefore an object of the present invention to provide such a system which accepts I/O devices on one end and connects to a standard bus on the other, which provides a topology which rapidly processes information provided by the, I/O devices, and which offers a software-based addressing scheme for the I/O devices connected thereto that provides confirmation of preselected addresses for a technician installing the system.

SUMMARY OF THE INVENTION

A control network incorporating the addressing scheme of the present invention is provided, comprising an input/output (I/O) bus manager, a plurality of network nodes which communicate with the I/O bus manager, and a corresponding number of I/O cluster unit groups which communicate with the network nodes. Each of the I/O cluster unit groups comprises a plurality of I/O cluster units. Attached to each of the I/O cluster units in the groups is at least one I/O device.

The I/O bus manager attaches directly to a standard computer communications bus provided by an I/O controller unit, such as a personal computer or an industrial programmable logic controller. The I/O bus manager also provides the logic required to manage the network nodes. The nodes in turn provide the logic required to manage the I/O cluster units, and the I/O cluster units provide the logic required to manage the attached I/O devices. Thus three levels of concurrent asynchronous processing exist, (i) between the I/O controller unit and the bus manager, (ii) between the bus manager and the network nodes, and (iii) between the network nodes and their associated cluster units. Accordingly, the bus manager, the network nodes and the cluster units process I/O concurrently and asynchronously.

The network nodes and the I/O cluster units are each provided with a CAN (Control Area Network) chip which enables efficient addressing and communications between the I/O bus manager and the plurality of I/O cluster units. The CAN chip permits soft addressing of the I/O devices in the system instead of hardwiring each of them to identify them to the I/O bus manager. The system thereby provides ease of installation and flexibility because the individual input signal wires and output control wires are attached to the I/O cluster unit, and the I/O cluster unit may then be wired to any network node on the I/O bus manager. The user need not hardwire the signal input lines or output control lines to specified inputs/outputs to the I/O controller, because addresses are not assigned until the user requests assignment from a given I/O cluster unit location.

The I/O controller unit has programmed into it a connectivity map which allocates addresses for all active and inactive possible I/O. devices in the network. The map is entered into the I/O controller by means of an editor, and is permanently stored in the I/O controller memory. The editor also permits the user to designate an I/O device as either active or inactive. By designating certain I/O devices as inactive, the I/O controller logic program may be executed without resulting in unwanted error messages or fault indications.

The addressing activity of the system begins upon power up of the network, at which time the I/O controller unit downloads the current connectivity map into each I/O bus manager. The I/O bus manager then checks to see if any of the I/O devices in the network either do not have addresses assigned to them or have more than one address assigned to them. If the I/O bus manager determines that each of the defined addresses for all of the I/O devices in the system have been correctly assigned to the proper I/O devices, the I/O bus manager monitors network node and I/O cluster unit activity for fault conditions which become known to the bus manager by means of-fault interrupt signals from the I/O cluster unit or network node. If no fault interrupt signal is received, the network enters the RUN mode, wherein a logic program in the I/O controller is executed.

If, however, the I/O bus manager determines that at least one of the defined addresses for a particular I/O device in the system has yet to be assigned or has been assigned the same address as another I/O device, the network is inhibited from entering the RUN mode. In the case of an unassigned or double address, the I/O bus manager enters a wait state, awaiting requests for address assignments from I/O cluster units which have no assigned address. Those cluster units not having an assigned address will send information to the I/O bus manager to identify themselves as input or output cluster units and to indicate that they have not yet been assigned an address.

An addressing button on the cluster unit provides the mechanism by which address assignments are requested from the I/O bus manager, and an address display on the cluster unit displays the address which is granted to the I/O cluster unit by the I/O bus manager. The I/O bus manager assigns the specific addresses to the I/O cluster units on a next lowest available address basis, regardless of whether an I/O device on the connectivity map is designated as active or inactive. The addressing buttons on each of the I/O cluster units in the network are depressed in sequence, during start up of the network, based on the address order outlined in a cluster configuration listing corresponding to the connectivity map.

After the next lowest available address is assigned to the requesting I/O cluster unit by the I/O bus manager, the unit confirms acceptance of this address by displaying the assigned address at the address display. The I/O bus manager then updates the connectivity map to indicate that the defined address has in fact been assigned, and then reverts to the initial step of again determining if there are still defined addresses on the map which remain unassigned. This procedure is repeated until the last defined address is assigned to an I/O cluster unit. Once the I/O bus manager determines that each of the defined addresses for all of the I/O devices in the system has been correctly assigned to the proper I/O device, and no faults are encountered, the system enters the RUN mode. In the RUN mode, the network nodes alternately call out for inputs and update outputs.

DETAILED DESCRIPTION OF THE PREFERRED EMBODIMENT

Figure 1:
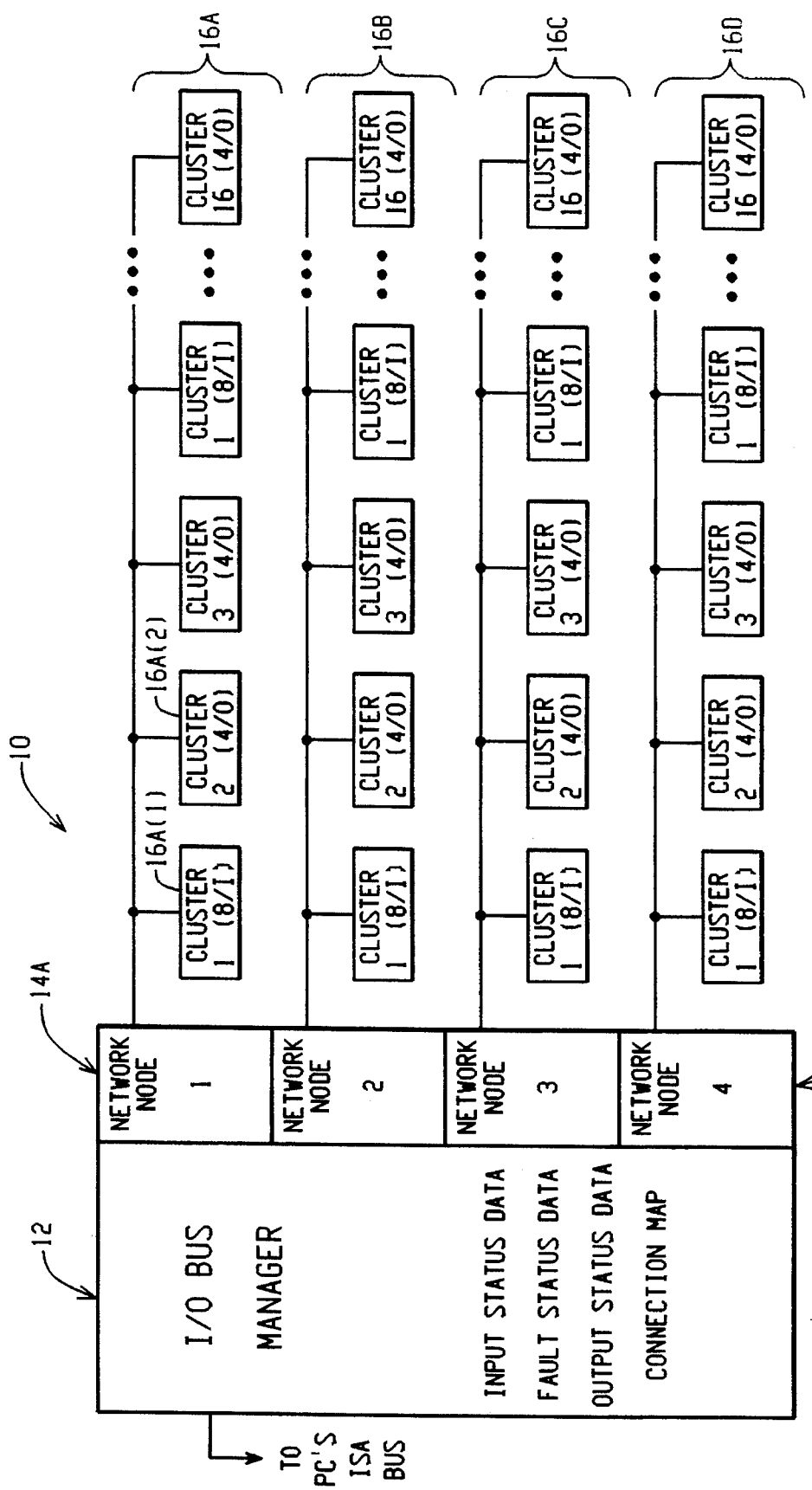
FIG. 1 is a block diagram of a control network constructed according to the present invention.

A block diagram of a control network 10 incorporating the addressing scheme of the present invention is shown in FIG. 1. The network 10 comprises an input/output (I/O) bus manager 12, a plurality of network nodes 14A–14D which communicate with the I/O bus manager, and a corresponding number of I/O cluster unit groups 16A–16D which communicate with the network nodes. Each of the I/O. cluster unit groups comprises a plurality of I/O cluster units: 16A(1) through 16A(n) for cluster group 16A, 16B(1) through 16B(n) for cluster group 16B, and so forth. The bus manager 12 attaches directly to a standard computer communications bus, such as an ISA bus. The standard communications bus is provided by an I/O controller unit (not shown), such as a personal computer or a programmable logic controller (herein referred to as a "PC/PLC"). Attached to each of the I/O cluster units in the groups is at least one I/O device.

The network 10 shown in FIG. 1 is adaptable to accommodate any number of I/O devices. For example, although each of the four cluster unit groups 16A–16D shown in FIG. 1 has 16 associated I/O cluster units, less than 16 I/O cluster units per cluster group are possible. Similarly, although four network nodes 14A–14D are shown, the network may operate with more or less than four network nodes 14 per I/O bus manager 12. However, the utilization of more than one I/O bus manager 12 per control network 10 is contemplated, so that any number of I/O devices may be monitored and controlled by the network 10.

Because the I/O bus manager 12 physically attaches to a standard communications bus, the control network 10 may be easily connected to an industrial programmable logic controller (PLC). However, the platform upon which the system resides may also be a standard personal computer (PC) which provides the logic software required to run the network. An example of this type of software is FLOPRO® or ISO 1131, although other programs may be utilized. The I/O bus manager which connects to the standard communications bus monitors and stores input and output status data, fault status data and a connectivity map which defines the addressing scheme and a transmission template for all of the I/O devices in the network. The I/O bus manager 12 also provides the logic required to manage the network nodes 14. The nodes in turn provide the logic required to manage the I/O cluster units, and the I/O cluster units provide the logic required to manage the attached I/O devices.

The network 10 therefore operates on four independently operating layers, or levels, of processing: the PC/PLC level, the I/O bus manager level, the network node level, and the I/O cluster unit level. The logic required for these four levels of processing is implemented, respectively, within each of these four levels of hardware and permits the addressing scheme and concurrent processing as more fully described below.

The network nodes 14 and the I/O cluster units 16 are each provided with a CAN chip which enables efficient addressing. and communications between the I/O bus manager 12 and the plurality of I/O cluster units 16. CAN is an acronym for Control Area Network, by Bosch®/Intel® relating to a communications integrated circuit chip for star/line communications. The CAN chip permits soft addressing of the I/O devices in the system instead of hardwiring each of them to identify them to the I/O bus manager 12. The CAN chip in each I/O cluster unit 16 may receive up to four output signals in the preferred embodiment from its corresponding network node 14 (if the I/O cluster unit is designated as an output I/O cluster unit) or up to eight inputs from input devices connected to it (if the I/O cluster unit is designated as an input I/O cluster unit). In alternative embodiments, the CAN chip in each I/O cluster unit may receive more than four output or eight input signals, respectively.

The CAN chips in the I/O cluster units multiplex input signals and send them to their corresponding network nodes 14 for processing by the I/O bus manager 12 and the PC/PLC. They also receive multiplexed output signals from the network nodes and demultiplex them to activate the correct output devices. The CAN chips in the I/O cluster units in both the network nodes and the I/O cluster units are bi-directional, i.e. they must perform both multiplexing and demultiplexing operations. Although CANchips are utilized in the preferred embodiment, the use of other types of integrated circuit chips is contemplated by the invention. All that is required is that these chips be programmed to format the data transferred between the I/O cluster units and the network nodes in a manner similar to the manner accomplished by the CAN chips. Moreover, the present invention contemplates that the I/O cluster units 16 and the network nodes 14 operating off of the same bus manager card 12 could mix other communications protocols besides the CAN protocol, could be interconnected by different types of physical media, and could operate at different baud rates.

The system thereby provides ease of installation and flexibility because the individual input signal wires and output control wires are attached to the I/O cluster unit 16, and the I/O cluster unit may then be wired, to any network node one the I/O bus manager. The user need not hardwire the signal input lines or output control lines to specified inputs/outputs to the PLC/PC, because addresses are not assigned until the user requests assignment from a given I/O cluster unit location. "Device-type" identification eliminates the possibility of hardwiring a signaling device into a PLC/PC input or an output control line to a PLC/PC output and then incorrectly defining the address of that input or output in the PLC/PC logic. Each cluster unit is provided with a device-type template which identifies the I/O devices attached to the cluster unit (e.g. discrete input, analog output) and which is mirrored in the connectivity map. If the device-type code contained at the cluster unit end does not match that contained in the connectivity map, that cluster unit is prohibited from having address assigned to it.

Figure 2A:
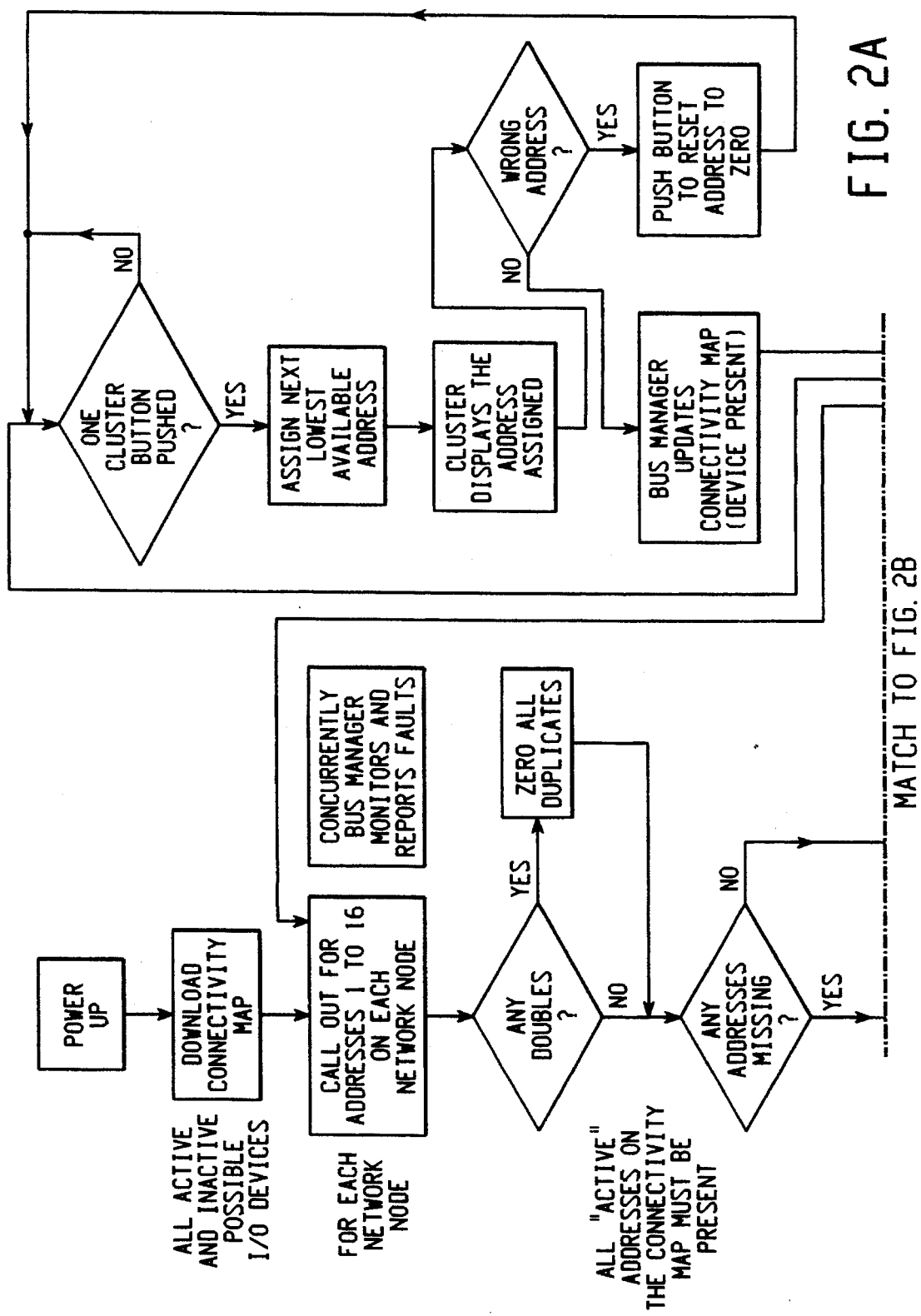
FIG. 2 is a flow chart illustrating the logic for implementing the addressing scheme of the present invention.
Figure 2B:
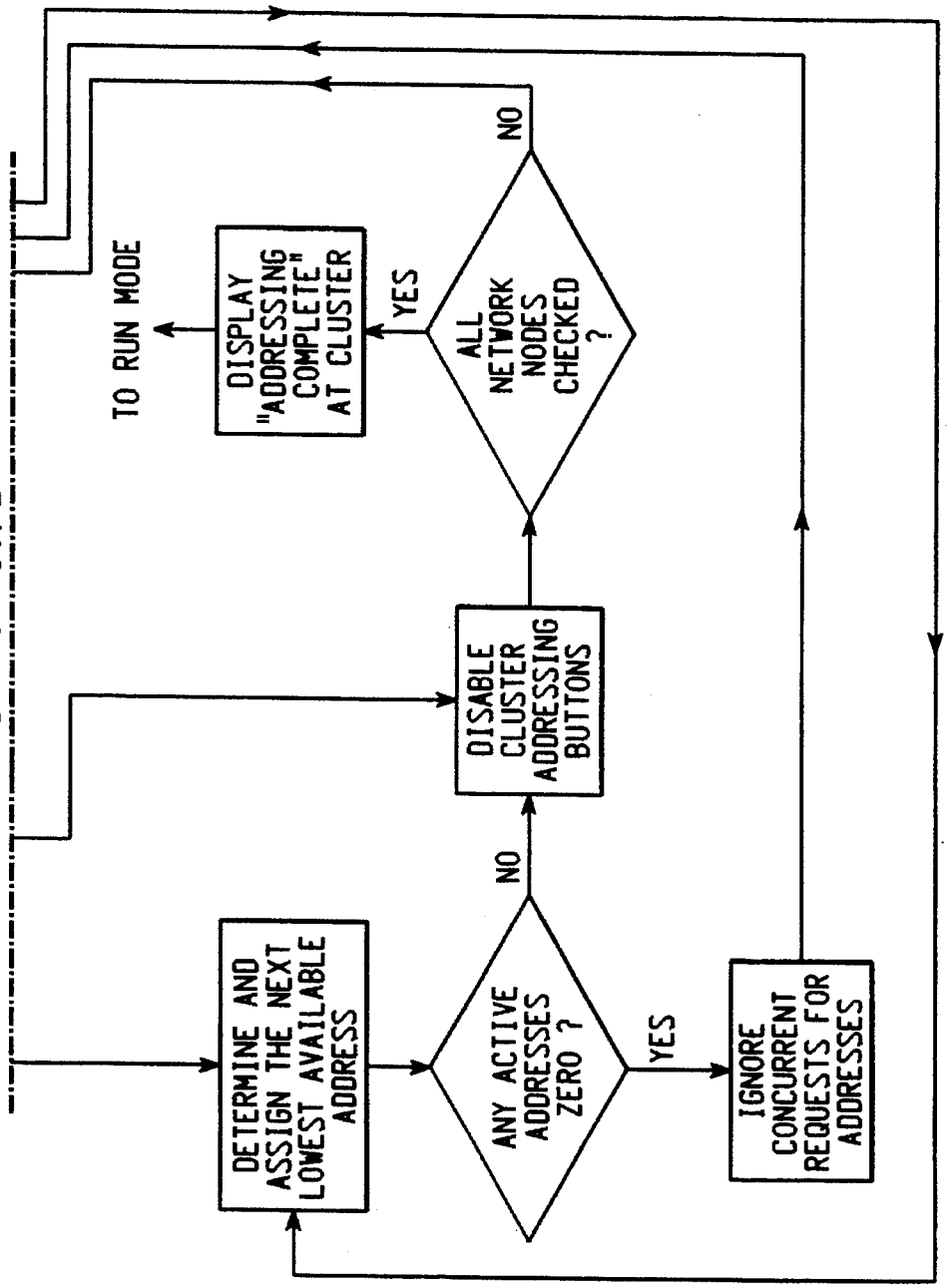

The logic which directs the addressing activity of the present invention is shown in the overall system flow chart of FIG. 2. The I/O controller unit (PC/PLC) has programmed into it, by known means, a connectivity map which allocates addresses for all active and inactive possible I/O devices in the network. The connectivity map also serves as the input/output, RUN mode transmission sequence desired by the logic controller. The map is entered into the PC/PLC by means of an editor, and is permanently. stored in the PC/PLC memory. The editor prompts the user to enter information regarding the number of I/O bus manager cards attached to the PLC/PC, the number of network nodes per I/O bus manager, the number of I/O cluster units per node, and the number of signaling device inputs/control outputs per I/O cluster unit 16. Editing of the connectivity map may be effected by means of the same editor during off-line operation of the network 10.

The editor also permits the user to designate an I/O device as either active or inactive. By designating certain I/O devices as inactive, the PC/PLC logic program may be executed without resulting in unwanted error messages or fault indications. An inactive status effectively reserves an address for an I/O device without requiring a cluster unit for that device to be electronically operative or even present at all in the system. Accordingly, the active/inactive designation allows for selective debugging of the logic associated with certain areas of an installed machine, even if other areas of the machine are not yet installed.

The addressing activity of FIG. 2 begins upon power up of the network 10, at which time the PC/PLC downloads the current connectivity map into each I/O bus manager 12. The I/O bus manager requires downloading of the most recent map from the PC/PLC upon each power up because it does not have the ability to edit the map itself, although in other embodiments it could have this capability. After the connectivity map has been downloaded into each I/O bus manager 12, the I/O bus manager checks to see if any of the I/O devices in the network (clusters 1–16 for each network node) either do not have addresses assigned to them or have more than one address assigned to them (i.e. a double address). The I/O bus manager 12 performs this check by comparing each of the defined address/I/O device combinations on the connectivity map with each of the actual address/I/O device combinations which has already been assigned by the I/O bus manager. If, based on this comparison, the I/O bus manager 12 determines that each of the defined addresses for all of the I/O. devices in the system have been correctly assigned to the proper I/O devices, the I/O bus manager monitors network node 14 and I/O cluster unit activity for fault conditions which become known to the bus manager 12 by means of fault interrupt signals from the I/O,cluster unit 16 or network node 14. If no fault interrupt signal is received, the network 10 enters the RUN mode, wherein a logic program in the PC/PLC is executed, reading input signals and writing output signals based on the status of the input signals.

If, however, the I/O bus manager 12 determines that at least one of the defined addresses for a particular I/O device in the system has yet to be assigned or has been assigned the same address as another I/O device, the network is inhibited from entering the RUN mode. If a double address is assigned, the I/O bus manager 12 will zero out both addresses. Accordingly, double addresses and unassigned addresses are both treated as unassigned addresses. In either case, the I/O bus manager enters a wait state, awaiting requests for address assignments from I/O cluster units which have no assigned address. Those cluster units not having an assigned address will send information to the I/O bus manager 12 to identify themselves as input or output cluster units and to indicate that they have not yet been assigned an address.

Figure 3:
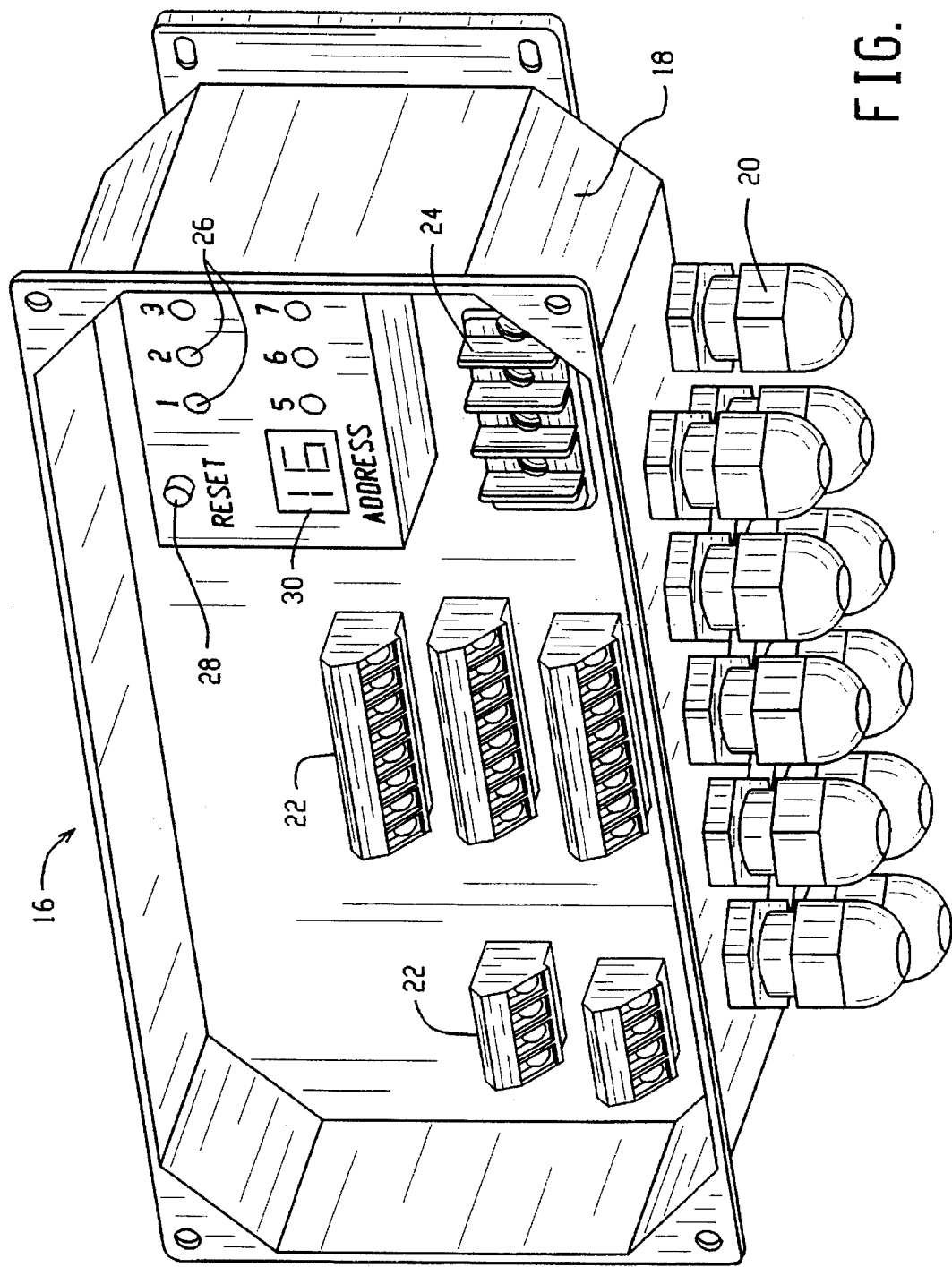
FIG. 3 is a perspective view of an I/O cluster unit shown in block diagram form as part of the system of FIG. 1.

The manner in which address assignments are requested from the I/O bus manager 12 is better understood with reference to FIG. 3. Shown in FIG. 3 is a typical I/O cluster unit 16, for example output I/O cluster unit 16(A)(16). The I/O cluster unit includes an enclosure 18 and mechanical connections 20 which permit electrical connections into the enclosure which are protected from the industrial environment. Included on the exterior of the enclosure are I/O terminal blocks 22 and a power terminal block 24. Also included on the exterior of the enclosure are status light emitting diodes (LEDs) 26, an addressing button 28 and an address display 30. The status LEDs are used to display operational conditions of the unit, such as the ON/OFF status of the input or output devices connected to the I/O cluster unit 16 or to indicate that power is applied to the unit. The addressing button 28 provides the mechanism by which address assignments are requested from the I/O bus manager 12, and the address display 30 displays the address which is granted to the I/O cluster unit 16 by the I/O bus manager 12.

The I/O bus manager assigns the specific addresses to the I/O cluster units on a next lowest available address basis, regardless of whether an I/O device on the connectivity map is designated as active or inactive. The addressing buttons on each of the I/O cluster units 16 in the network 10 are depressed in sequence, during start up of the network, corresponding to the address order outlined in the connectivity map. Typically, a technician having in hand a cluster configuration listing corresponding to the map will depress the buttons in the prescribed order to individually request addresses for each I/O cluster unit.

When the addressing button on an I/O cluster 16 is pressed, during the time when the I/O bus manager 12 is awaiting requests for address assignments from I/O cluster units, that I/O cluster unit sends a message to the I/O bus manager requesting an address. In effect, depressing the addressing button electrically grounds a pin on the CAN chip in the. I/O cluster unit, and the CAN chip broadcasts this event to the I/O bus manager via its associated network node 14. Referring back to the general flow chart of FIG. 2, the I/O bus manager 12 determines if the request is being made by a single I/O cluster unit or if two or more I/O cluster units are simultaneously making a request. Although simultaneous requests would likely only occur if two or more addressing buttons in the network were depressed at the time the network powers up, the I/O bus manager has the capability of blocking simultaneous requests so that assignment of double addresses does not occur.

After the next lowest available address is assigned to the requesting I/O cluster unit by the I/O bus manager 12, the unit confirms acceptance of this address by displaying the assigned address at the address display 30. The I/O bus manager 12 then updates the connectivity map to indicate that the defined address has in fact been assigned, and then reverts to the initial step of again determining if there are still defined addresses on the map which remain unassigned. This procedure is repeated until the last defined address is assigned to an I/O cluster unit 16.

The addressing scheme described above prevents addresses from being assigned to the wrong I/O devices in the network as follows. If, upon confirmation by the I/O cluster unit 16 of an assigned address, the address displayed at the address display 30 is not the expected address as shown on the connectivity map, the technician requesting the address may take notice of the error and initiate corrective action. The corrective action involves depressing the addressing button a second time, which zeroes out the address assigned to that I/O cluster unit 16. The technician may then proceed to the correct I/O cluster unit and request an address which should be the expected address. Once the last available address is assigned by the I/O bus manager, the ability to initiate corrective action is taken away from the technician. In an industrial environment, the ability to visually verify the correctness of an assigned address is a significant advantage over the DIP switch method, which does not provide any visual feedback for verifying an address assignment.

As explained above, once the I/O bus manager 12 determines that each of the defined addresses for all of the I/O devices in the system has been correctly assigned to the proper I/O device, the I/O bus manager 12 monitors network node 14 and I/O cluster unit activity for fault conditions. Faults are reported to the I/O bus manager 12 by the network nodes 14. Faults include address related faults and non-address related faults detected by either the I/O cluster units 16 or the network nodes 14, such as defective outputs, thermal overload conditions, or communications errors.

If a non-address related fault is reported, the I/O bus manager stores this fault, preventing entry into the RUN mode. If an address related fault is reported (e.g. an I/O cluster unit has lost its address as a result of memory failure), the I/O bus manager 12 first determines if the ability to initiate corrective action has been taken away, that is the last available address has already been assigned by the I/O bus manager. If the ability to initiate corrective action has been taken away, again the fault is stored, preventing entry into the RUN mode. If, however, the ability to initiate corrective action has not been taken away, the I/O bus manager 12 again enters a wait state, awaiting requests for address assignments from I/O cluster units.

Figure 4:
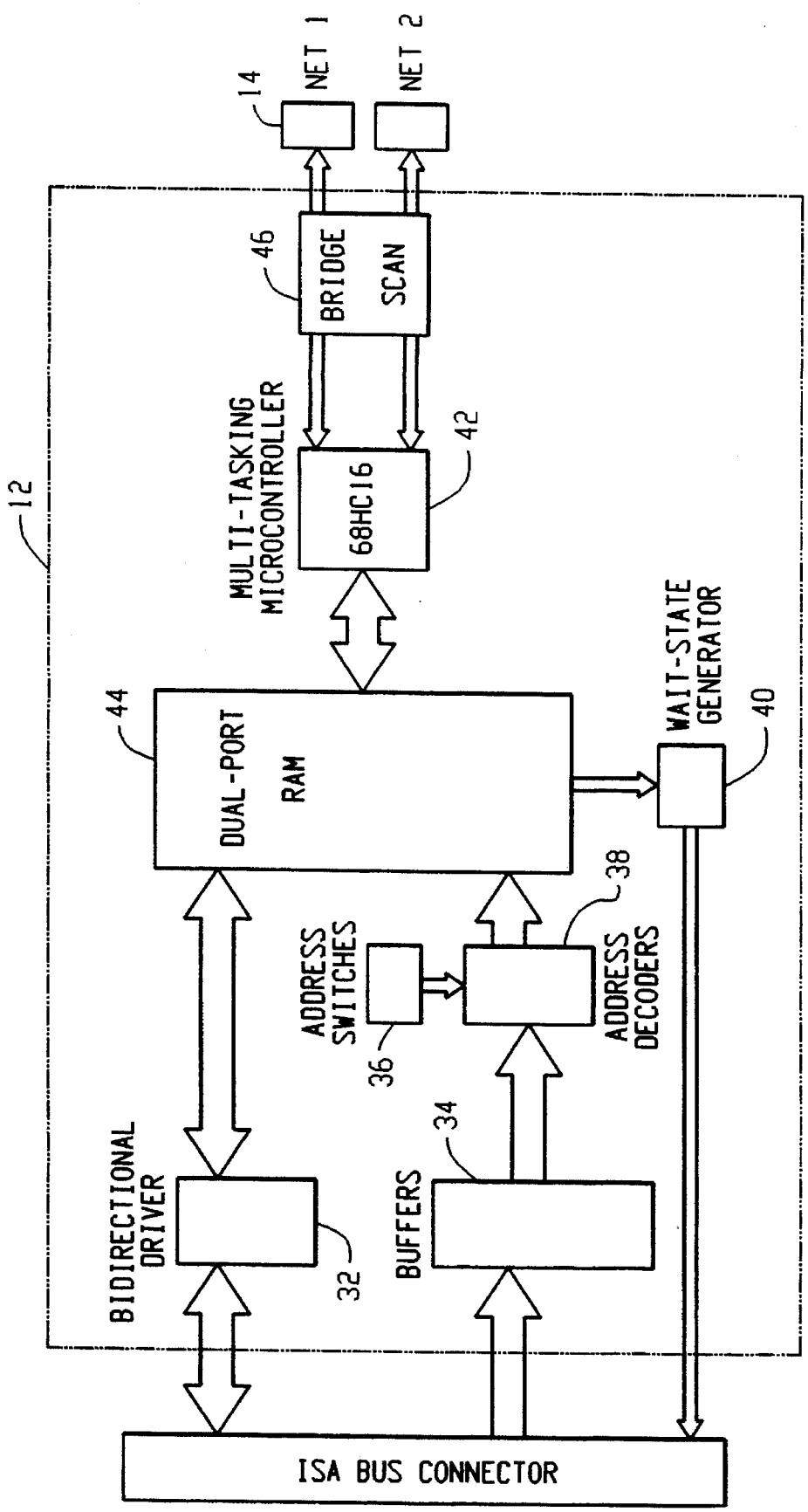
FIG. 4 is a circuit block diagram of the I/O bus manager shown in the network of FIG. 1.

A circuit block diagram of the I/O bus manager 12 of FIG. 1 is shown in FIG. 4. The function of the I/O bus manager 12 is to route information between the PC/PLC and the I/O cluster units 16 in the network. Bidirectional driver circuitry 32 and buffer circuitry 34 are off-the-shelf items which facilitate interfacing of the I/O bus manager card with a standard computer bus connection such as an ISA bus connection. The I/O bus manager 12 includes address switches 36 and an address decoder 38 which identifies the I/O bus manager to the PC/PLC if more than one I/O bus manager card is used in the system. A wait-state, or latency, generator 40 is provided for generating the time interval required between the instant the PC/PLC initiates a call for data and the instant at which the actual transfer of data begins. A multi-tasking microprocessor 42 manages information transfer between the PC/PLC and the network nodes 14, and in the preferred embodiment is a 68HC16 type microprocessor. Information transferred between the PC/PLC and the network nodes 14 via the I/O bus manager 12 passes through dual port RAM 44 and a bridge scan 46, both of which are buffering devices, as better explained with reference to FIG. 5.

Figure 5:
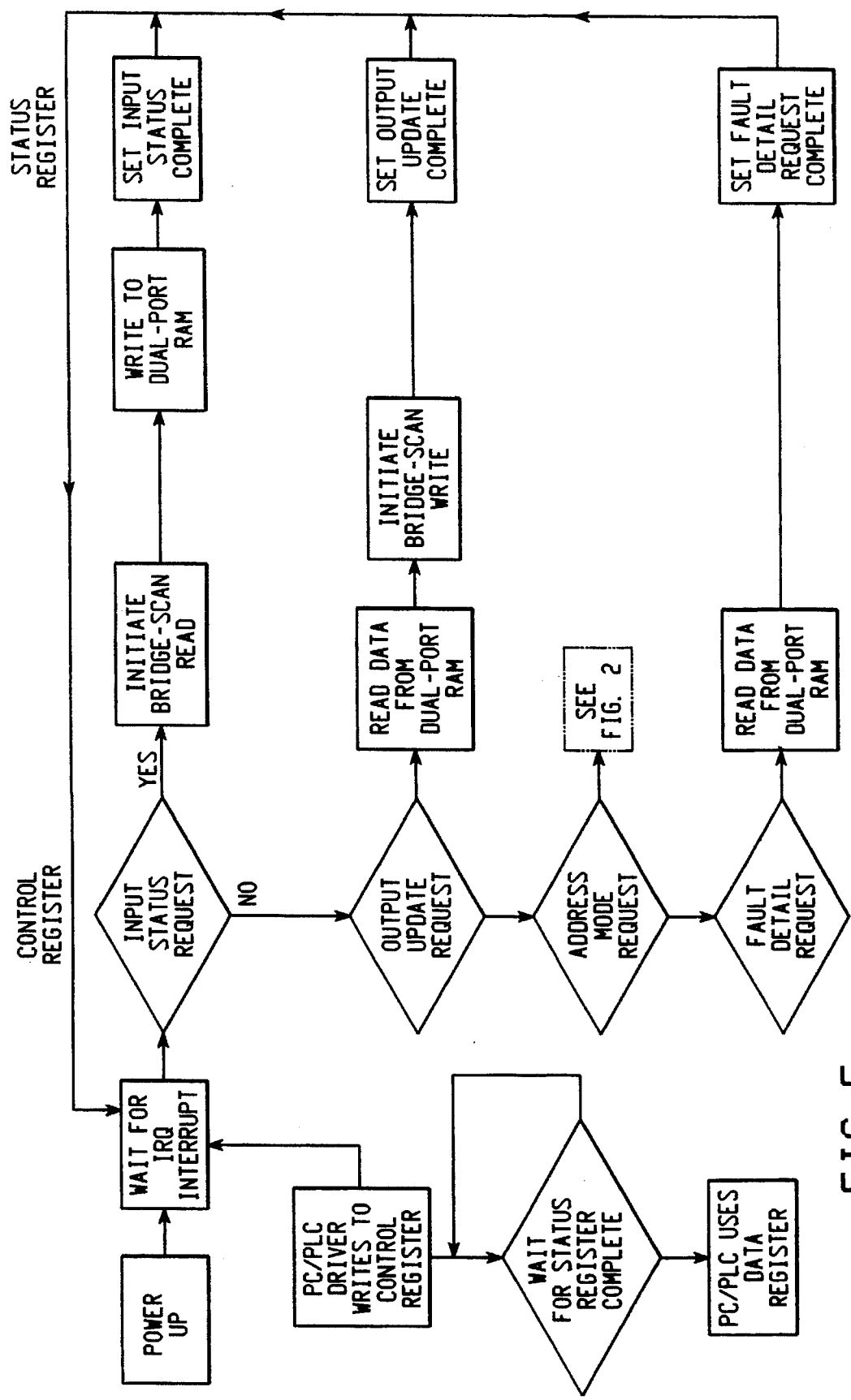
FIG. 5 is a flow chart representing the software written for the microprocessor on the I/O bus manager shown in the network of FIG. 1.

FIG. 5 shows a flow chart representing the software written for the 68HC16 microprocessor in the I/O bus manager 12. The I/O bus manager is provided with four registers: two data registers, through which information flows between the PC/PLC and the I/O bus manager, a control register which the PC/PLC can write to, and a status register which the PC/PLC can read from. The data registers and the control register are resident in the dual port RAM 44 of FIG. 4. Also included in the dual port RAM are the data fields representing the current version of the connectivity map which has been downloaded form the PC/PLC to the I/O bus manager 12.

Upon power up of the network 10, The 68HC16 microprocessor enters a wait-state where it waits for a interrupt request (IRQ) generated by the PC/PLC. The interrupt request is generated when the PC/PLC wants to write to the control register in the I/O bus manager 12. The messages which occasion an interrupt request include: fault status requests, address mode requests, reset CAN bus requests, or generic read or write requests. After writing to the control register, the PC/PLC waits and then reads the status register in the I/O bus manager 12 to determine if the I/O bus manager has acknowledged the control register message. If the status register contains an acknowledgement bit in the control register, the PC/PLC interprets the status register as a reply to the control register message and initiates reads from or writes to the two data registers. This method of handshaking insures that the I/O bus manager 12 recognizes messages from the PC/PLC and is then able to take appropriate responsive action.

The flow chart of FIG. 5 represents information processing activity which occurs at the I/O bus manager level during both the RUN mode and the ADDRESSING mode. After the I/O bus manager microprocessor 42 receives the interrupt request from the PC/PLC, it determines from information in the control register if the message is an input status request or an output update request.

The input status request and the output update request are used in the RUN mode. The bus manager 12 and the network nodes 14 change from the ADDRESSING mode to the RUN mode after all of the active clusters in the connectivity map (which connectivity map also defines the RUN mode transmission sequence of data from the bus manager 12 to the PC/PLC) respond to a call, that is, they have demonstrated that they are operable and that the indeed have a unique, active address assigned thereto.

In the RUN mode, the network nodes 14 alternately call out for inputs and update outputs. When the network node 14 calls out for inputs, it demands a response from each active node, sequentially, one per call out. The network node will also request inputs from any node whose input has changed from the last request. Thus, on the first call out, the network node 14 will ask cluster 1 to respond to its status request and to determine inputs that have changed. On the next call out, the network node 14 will ask cluster 2 to respond to its status request and to determine inputs that have changed. This process is repeated through cluster 16 and then begins again with cluster 1. After a single call out for inputs from the clusters, the network node 14 then updates all the outputs on its network. This loop operates asynchronously with respect to the I/O updates and status check tasks.

In addition, the first eight bits of inputs transmitted from the bus manager 12 to the PC/PLC indicate the status of the eight potential network nodes 14 on each bus manager card. The PC/PLC can then initiate a "Fault Detail Request" to determine what actions to take on the part of the logic. The last five fault occurrences are reported to the PC/PLC unit for problem analysis. The Fault Detail takes the form of significant error codes. This Fault Detail Request allows the PC/PLC unit to disturb the time deterministic behavior of the system only as the PC/PLC unit deems necessary.

The bus manager's microprocessor 42 asynchronously and continually moves fresh data in both directions between the PC/PLC and the network nodes 14. Thus three levels of concurrent asynchronous processing exist, (i) between the PC/PLC and the bus manager microprocessor 42, (ii) between the bus manager microprocessor 42 and the network node 14, and (iii) between the network nodes 14 and their associated cluster units 16. In other words, the bus manager 12, the network nodes 14 and the cluster units process I/O concurrently and asynchronously. These three levels of concurrent processing permit connection of cluster units to multiple network nodes to optimize response times, distances, critical signal isolation, discrete control signal isolation, analog-to-digital (A/D) or information signal isolation, or critical-fault safe-state control.

Within each of the network nodes 14 and I/O cluster units 16 in the network 10 is a CAN chip with an on board 6805 microprocessor which enables the soft addressing scheme of the present invention and which further enhances internal diagnostic capabilities. The 6805 model is an 8-bit microprocessor with an on-board CAN module, such as the MC68HC705X4 model by Motorola®, designed around the industry standard M68HC05 CPU. The CAN module incorporated into the 6805 chip is complete with line interface circuitry comprising output drivers and input comparators and is capable of handling all communication transactions flowing across a serial star/line bus structure with minimal microprocessor intervention. The star/line topology of the present invention permits network nodes to broadcast simultaneously to all cluster units connected thereto. Between the two CAN chips in the network node and I/O cluster units, all redundant wiring may be eliminated due to the multiplexing/ demultiplexing functions provided by the CAN chips.

The microprocessors on the network nodes 14 are preprogrammed to process data received from the I/O cluster units 16 and provide it to the I/O bus manager 12 in a format it can process. Each of the network nodes has therein a CAN chip which interfaces between the individual I/O cluster units attached to it and the I/O bus manager 12. Upon power-up, the I/O bus manager directs the 6805 microprocessor to broadcast to all of the I/O cluster units to see if any of the active I/O devices in the network either do not have addresses assigned to them, or if double addresses have been assigned. The broadcast is made by the CAN chip on the network nodes 14 to CAN chips on the I/O cluster units 16. The CAN chip on the network nodes receives responses from all of the I/O cluster units and reports the address status back to the I/O bus manager 12 via the bridge scan buffer 46. The 6805 microprocessor in the network nodes 14 is also programmed to poll the I/O cluster units 16 attached thereto in the RUN mode for inputs and outputs, as well as for internally diagnosed faults. Inputs broadcast by the I/O cluster unit CAN chips are read by the network node CAN chips, and are written to the bridge scan buffer 46 for processing by the I/O bus manager 12. Outputs written into the bridge scan buffer 46 by the I/O bus manager 12 are read by the network node microprocessors and broadcast by the network node CAN chips to the I/O cluster unit CAN chips. In this manner, the network nodes 14 function as a hand-off mechanism between the I/O bus manager 12 and the I/O cluster units 16.

Figure 6:
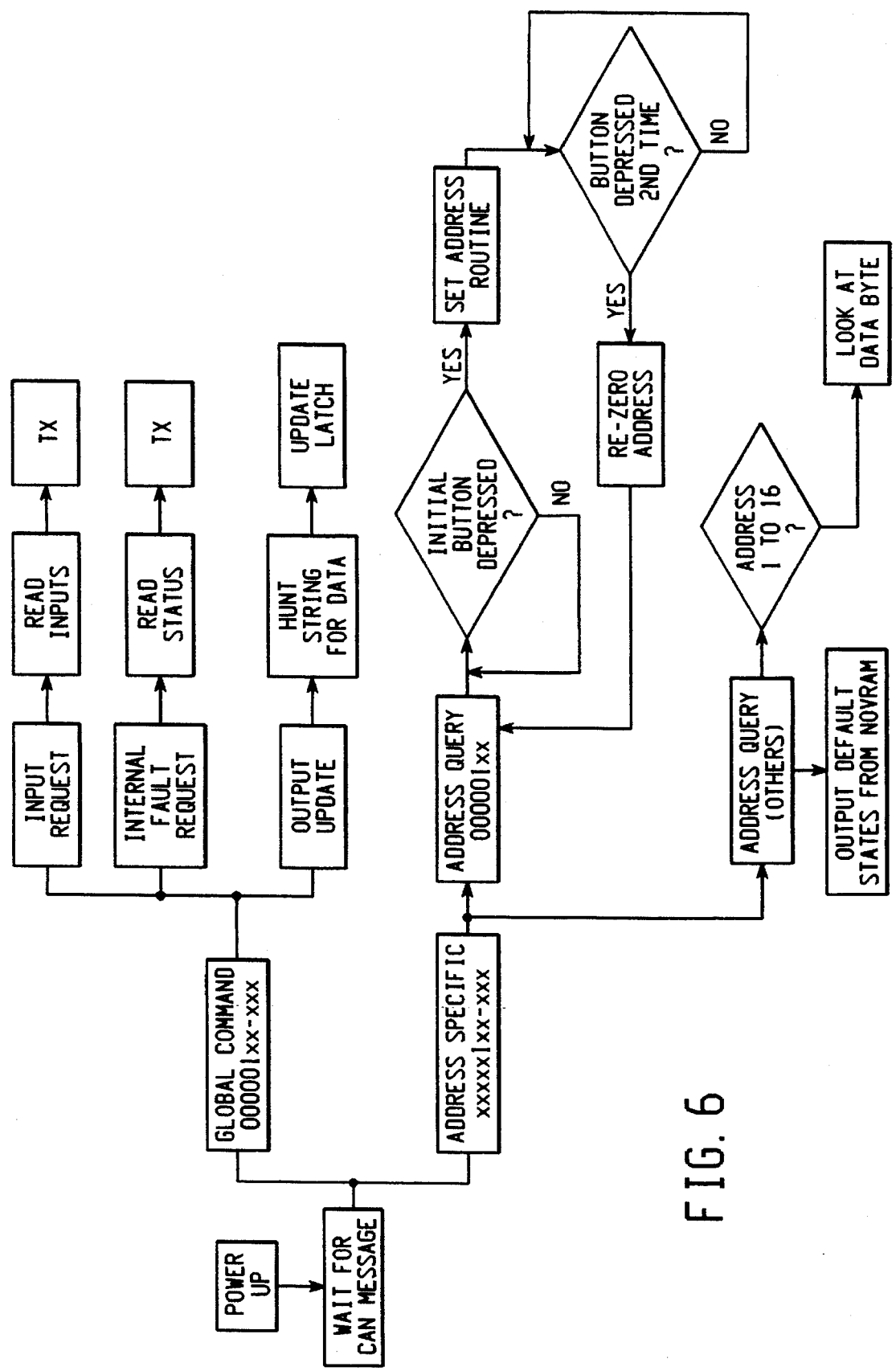
FIGS. 6 is a flow chart illustrating the software written for the microprocessors in the I/O cluster units shown in the network of FIG. 1.
Figure 7:
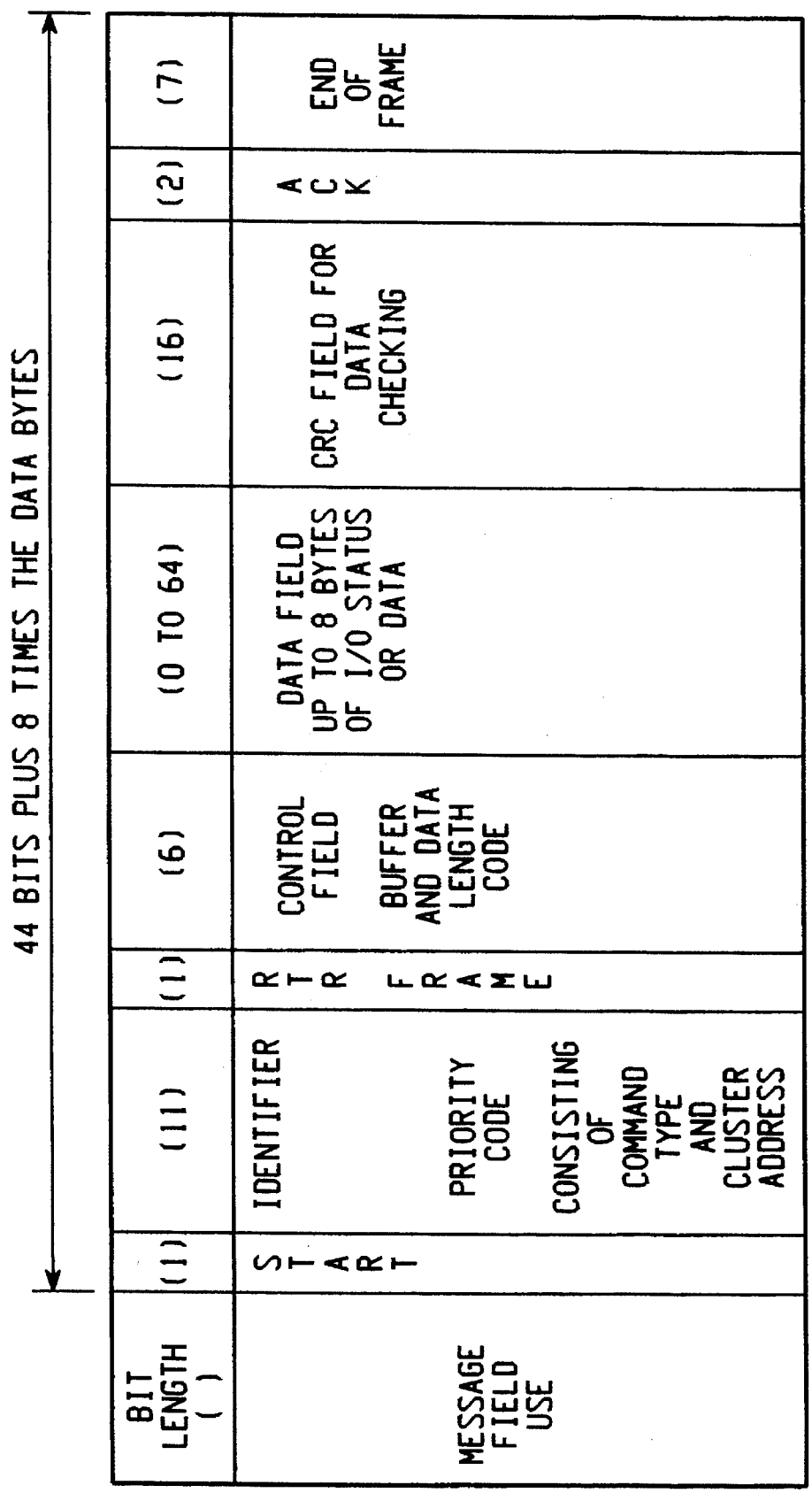
FIG. 7 is a diagram illustrating the structure of messages which are exchanged between network nodes and the I/O cluster units, using standard CAN protocol.

The lowest level of software used in the addressing scheme of the present invention is found at the I/O cluster unit level. As mentioned above, each of the I/O cluster units 16 has therein a CAN chip with an on board 6805 microprocessor. FIG. 6 shows a chart which represents the software written for the 6805 microprocessor in the I/O cluster units 16. Upon power up, the I/O cluster unit waits for a CAN message from the network node 14 to which it is attached. The basic CAN message structure is shown in FIG. 7, and corresponds to known CAN protocol. As shown in FIG. 7, the second field of the message structure is an 11 bit identifier field. The 6805 microprocessor in the I/O cluster unit 16 determines from this 11 bit identifier whether the CAN message from the network node 14 is a global command destined for all I/O cluster units or only a specific individual cluster unit.

If the CAN message is global, it could be an input request (if the I/O cluster unit has input devices attached thereto), an output update (if the I/O cluster unit has output devices attached thereto), or a request for any fault diagnosed internally by the 6805 microprocessor. For example, during the ADDRESSING mode of operation, a global input request is made to all I/O cluster units 16 by the I/O bus manager via the network nodes 14 to scan for missing addresses, zero addresses or duplicate addresses. If the message is a fault request or an input request, the microprocessor reads the internally diagnosed fault data or the status of its connected input devices, respectively, and transmits this data back to the I/O bus controller via the network node. If the message is an output update, the 6805 microprocessor extracts from the 64 bit (8 byte) data field of the CAN message (see FIG. 8) the appropriate data for each of up to four output devices attached thereto, and updates a latch which contains this data. The 64 bit string contains data for all output devices connected to a particular I/O cluster unit 16 and all cluster units connected to a network node. The data field may contain either discrete (e.g. ON-OFF) cluster data or information (e.g. messages or A/D converted data) or a combination of discrete and non-discrete data.

Accordingly, the preferred embodiment of a control network addressing mechanism has been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed. For example, the addressing button acknowledgement function could be satisfied by the touch of a technician's screwdriver, a sensor on the cluster module, or the controlled activation of an input.

What we claim is:

1. A system for assigning addresses to input/output (I/O) devices in a control network, and for verifying addresses assigned to the I/O devices, comprising:
   a logic controller providing memory into which a connectivity map may be programmed, said connectivity map defining a specific expected address for each I/O device in the network, said logic controller further providing an external controller bus and logic for downloading said connectivity map to an I/O bus manager connected to said logic controller via said external controller bus, said I/O bus manager providing a mechanism for assigning said specific addresses to said I/O devices;
   at least one node processor connected to said I/O bus manager, said at least one node processor including a multiplexer for multiplexing output signals from said I/O bus manager and a demultiplexer for demultiplexing input signals from said I/O devices; and
   at least one I/O cluster processor connected to each of said at least one node processor, said at least one I/O cluster processor including a multiplexer for multiplexing input signals from said I/O devices and a demultiplexer for demultiplexing output signals from said at least one node processor;
   said at least one I/O cluster processor including (i) a manager; (ii) a visual indicator for displaying the address device for manually requesting an address from said I/O bus assigned by said I/O bus manager; and (ii) a device for manually rejecting said address assigned to it by said I/O bus manager if said assigned address is not the expected address for said I/O cluster process defined in said connectivity map.

2. The system of claim 1, wherein said connectivity map addresses are numerically identified, and wherein said I/O bus manager assigns said specific addresses to said I/O devices on a next lowest available address basis.

3. The system of claim 2, wherein said multiplexer and said demultiplexer on said at least one node processor and said multiplexer and said demultiplexer on said at least one I/O cluster processor are provided by a controller area network (CAN) integrated circuit located on each of said at least one node processor and said at least one I/O cluster processor.

4. The system of claim 2, wherein said I/O cluster processor device for manually rejecting said address is disabled if said address assigned to it by said I/O bus manager is the last address available remaining on said connectivity map.

5. The system of claim 4, wherein each of said I/O devices in the network is designated as having either an active or inactive status, and wherein said I/O cluster processor device for manually rejecting said address is disabled if said address assigned to it by said I/O bus manager is the last address available remaining on said connectivity map corresponding to an active device.

6. The system of claim 4, wherein each of said I/O cluster processors further provides a visual indication of the addressed/non-addressed status of the I/O devices attached thereto and the assigned address for that I/O cluster processor.

7. The system of claim 4, wherein each of said I/O bus managers manages up to eight node processors connected thereto, and each of said node processors concurrently manage up to sixteen I/O cluster devices attached thereto.

8. The system of claim 7, wherein said I/O cluster manages up to four output devices or eight input devices, or any combination thereof.

9. The system of claim 2, wherein said node processors communicate to said I/O cluster processors via star/line topology wherein said node processors broadcast simultaneously to all I/O cluster processors connected thereto.

10. The system of claim 5, wherein an inactive I/O device has reserved for it an address without requiring an I/O cluster processor associated with that device to be present in the system.

11. The system of claim 2, wherein three levels of concurrent asynchronous processing exist between (i) said logic controller and said I/O bus manager, (ii) said I/O bus manager and said node processor, and (iii) said node processor and said I/O cluster processor.

12. The system of claim 2, wherein said I/O bus manager and said node processor change from an ADDRESSING mode to a RUN mode after all of said active I/O devices in the connectivity map have verified that they have a unique address assigned thereto 13. The system of claim 12, wherein each of said I/O cluster processors includes an identification template provided with code which identifies I/O devices attached thereto and which is contained in said connectivity map.

14. A method of assigning addresses to input/output (I/O) devices in a control network, and for verifying addresses assigned to the I/O devices, comprising the steps of:
   allocating specific expected addresses to each of the I/O devices in the control network to define a connectivity map,
   storing said connectivity map into memory of a logic controller;

downloading said connectivity map to an I/O bus manager connected to said logic controller via an external controller bus, manually requesting assignment of one of said specific addresses with one of said I/O devices;

assigning one of said specific addresses to said requesting I/O device using said I/O manager;

visually displaying the address assigned by said I/O bus manager; and manually rejecting said address assigned to said requesting I/O device by said I/O bus manager to zero said assigned address if said assigned address is not the expected address for said I/O device defined in said connectivity map.

15. The method of claim 14, wherein said connectivity map addresses are numerically identified, and wherein said I/O bus manager assigns said specific addresses to said I/O devices on a next lowest available address basis.

16. The method of claim 15, further comprising the step of disabling the ability to manually reject said address if said address assigned to said I/O device by said I/O bus manager is the last address available remaining on said connectivity map.

17. The method of claim 16, wherein each of said I/O devices in the network is designated as having either an active or inactive status, further comprising the step of disabling the ability to manually reject said address if said address assigned to said I/O device by said I/O bus manager is the last address available remaining on said connectivity map corresponding to an active device.

18. The method of claim 16, further comprising the step of providing a visual indication of the ON/OFF status of the I/O devices in the network.

19. The method of claim 17, further comprising the steps of connecting said I/O devices to an I/O cluster processor, connecting said I/O cluster processor to a node processor, and connecting said node processor to said I/O bus manager, and wherein said node processor communicates to said I/O cluster processor via star/line topology wherein said node processor broadcasts simultaneously to all I/O cluster processors connected thereto.

20. The method of claim 19, wherein an inactive I/O device has reserved for it an address without requiring an I/O cluster processor associated with that device to be present in the system.

21. The method of claim 19, wherein three levels of concurrent asynchronous processing exist between (i) said logic controller and said I/O bus manager, (ii) said I/O bus manager and said node processor, and (iii) said node processor and said I/O cluster processor.

22. The method of claim 19, wherein said I/O bus manager and said node processor change from an ADDRESSING mode to a RUN mode after all of said active I/O devices in the connectivity map have verified that they have a unique address assigned thereto.

23. The method of claim 19, wherein each of said I/O cluster processors includes an identification template which identifies I/O devices attached thereto and which is contained in said connectivity map.

* * * * *

UNITED STATES PATENT AND TRADEMARK OFFICE
CERTIFICATE OF CORRECTION

PATENT NO. : 5,551,053
DATED : Aug. 27, 1996
INVENTOR(S) : Nadolski, et al.

It is certified that error appears in the above-indentified patent and that said Letters Patent is hereby corrected as shown below:

Col. 11, claim 1, line 26, before "manager" insert
--device for manually requesting an address from said I/O bus-- lines 27-28, after the first occurrence of "address" delete "device for manually requesting an address from said I/O bus"

line 28, delete "(ii)" and insert --(iii)--.

Signed and Sealed this

Twenty-ninth Day of October 1996

Attest:

BRUCE LEHMAN

*Attesting Officer*     *Commissioner of Patents and Trademarks*